April 7, 1959 L. A. DURANT 2,881,384
THERMAL ELECTRIC ALTERNATOR
Filed Aug. 26, 1958 2 Sheets-Sheet 1
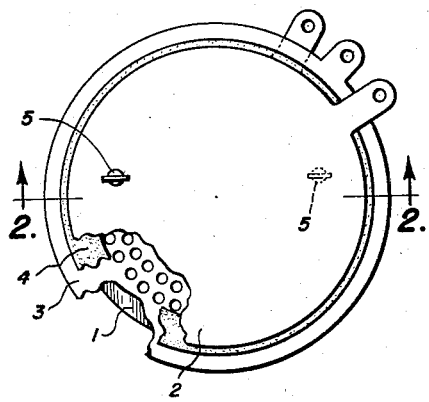
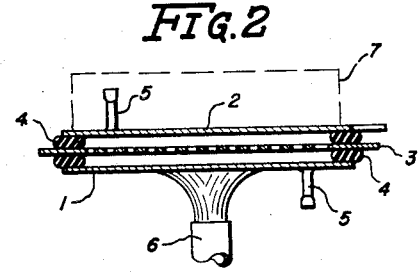
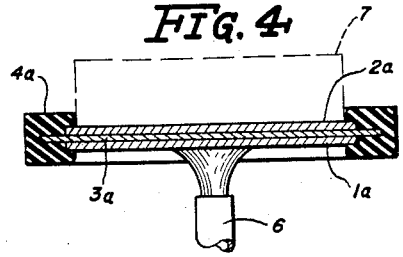
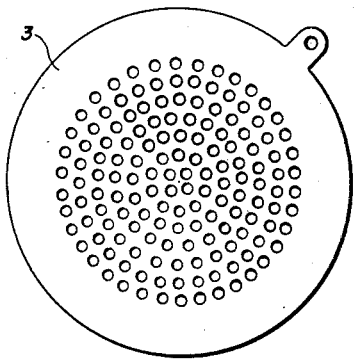
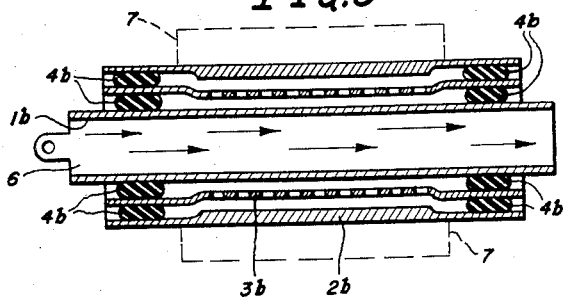
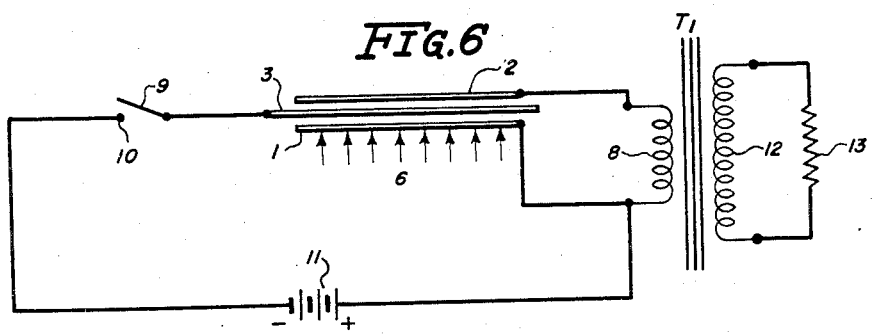
INVENTOR
Lyndon A. Durant
BY Lloyd J. Anderes INVENTOR
Lyndon A. Durant
BY United States Patent Office 2,881,384
Patented Apr. 7, 1959

2,881,384

THERMAL ELECTRIC ALTERNATOR

Lyndon A. Durant, Chicago, Ill.

Application August 26, 1958, Serial No. 757,417

7 Claims. (Cl. 322—2)

This invention relates in general to thermal electric generators and more particularly to a thermal generator means for producing alternating current directly from a source of heat.

Several methods and devices for producing direct current by the direct conversion of applied heat are now known including thermo couples, electron emissive metals and solid state semi-conductors. One embodiment of such a device and the properties of certain metals applicable for this use is disclosed in U.S. Patent No. 2,510,397.

The above thermal convertors produce direct current only at extremely low voltage, and when such devices are series connected to obtain useful potentials the internal resistance of the devices themselves and other complications greatly limit their practical use.

The present invention overcomes the above objections and disadvantages by the provision of an improved thermal electric generator and electronic control means whereby the said generator will directly convert thermal energy into alternating current electric energy, which energy may be transformed into a wide range of potentials useful for commercial application, which is a principal object of the invention.

Another object of the invention is the provision of a thermal electric generator having an electron emissive element retained in spaced relation to an electron collective element with a foraminated control element there between and the active surfaces of said elements hermetically sealed therein by refractory insulation bonded thereto and the space between said elements retaining inert gas at low pressure.

Another object of the invention is the provision of an emissive type thermal generator having a control element positioned between the emissive and collector elements of the generator for the cyclic control of the electric output of the latter when said control element is biased with a cyclic negative potential.

Another object of the invention is the provision of three element thermal generator and a potential raising transformer connected to the output thereof for increasing the potential of said electric output when the control element of the generator is excited by a cyclic potential.

A further object of the invention is the provision of a balanced push-pull thermal electric generator having a transformer connected to the output elements thereof and a cyclic potential means connected to the control elements of said generator for producing a full wave electric energy output to a load connected to said transformer when energized.

A further object of the invention is the provision of a thermal electric alternator having an output transformer containing a tertiary winding connected to the control elements of said generator through a rectifying means for providing cyclic potential to said control elements for self-exciting the latter.

These and other objects and advantages in each of several embodiments of the invention are described and shown in the appended specification and drawings in which:

Fig. 1 is a plan view of an electric thermal generator.

Fig. 2 is a cross sectional view taken through section line 2—2, Fig. 1.

Fig. 3 is a plan view of the control element shown Fig. 1.

Fig. 4 is a cross sectional view of an alternate form of the generator shown Fig. 1.

Fig. 5 is a cross sectional view of another alternate form of the electric generator shown Fig. 1.

Fig. 6 is a diagram illustrating means for producing pulsating electric power from thermal energy.

Figure 8:
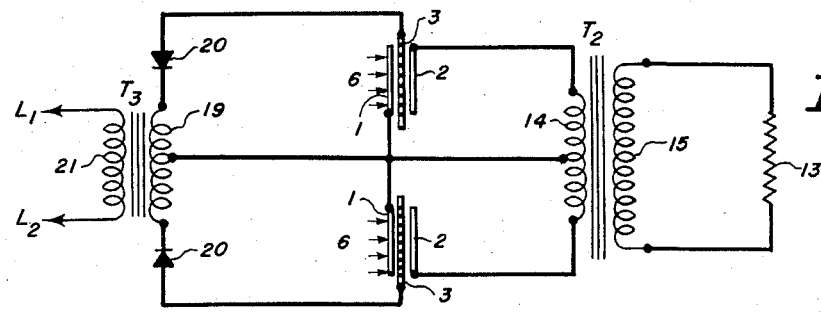
Fig. 8 is a diagram illustrating means for producing alternate electric power from thermal energy including an electronic oscillatory exciter.
Figure 9:
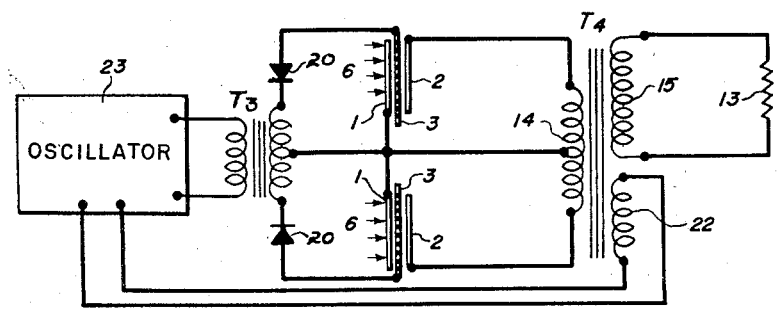

Fig. 9 same as Fig. 8 including self-excitation means.

Figure 10:
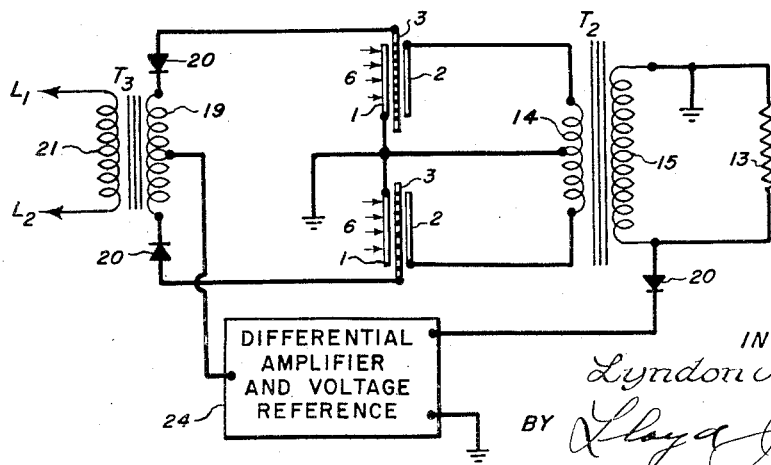

Fig. 10 same as Fig. 8 including load regulation means.

Referring to Figs. 1 and 2 a preferred form of thermal electric generator comprises an emissive element 1 retained in spaced relation to a collector element 2 with a control element 3 positioned therebetween. Their elements are retained and sealed in position shown by hermetic bonding to insulating discs 4 preferably made from refractory ceramic material. The control element 3 shown in Fig. 3 is preferably made of heat resistant metal and has a foraminated central portion through which the normal electron flow passes.

The elements 1 and 2 are provided with sealing tubes 5 for evacuation of the internal space in the generator and the admission of inert gas therein.

A source of heat 6 represents any form of thermal energy applied to the element 1 and the dotted enclosure 7 illustrates a passage for a coolant over element 2 when required.

Fig. 4 illustrates a solid state generator substantially the same as that shown in Figs. 1 and 2 except the elements 1a, 2a, and 3a are retained in intimate contact by insulators 4a with each other and made from appropriate materials for generating electric energy when heated by heat source 6.

Fig. 5 illustrates another form of generator in which elements 1b, 2b, 3b and insulators 4b are tubular in form whereby thermal energy 6 is adapted to flow through a central passage formed by element 1b and in contact therewith.

Fig. 6 is an elementary diagram showing control components and circuit means for above described generators for generating pulsating electric energy from a source of thermal energy.

A step-up transformer $T_1$ has its primary 8 connected to elements 1a and 2a and its secondary 12 connected to a load represented by resistor 13. A D.C. voltage source has its positive terminal connected to control element 3 and its negative terminal connected to element 1 through a switch 9—10.

When element 1 of the generator is heated and the switch 9—10 alternately closed and opened, low voltage high current pulses will be applied to primary 8. These power pulses will appear in the secondary 12 and be transmitted to the load 13 at a voltage corresponding to the ratio of the transformer $T_1$ under the assumption the impedance of the load 13 is matched to the secondary 12.

Figure 7:
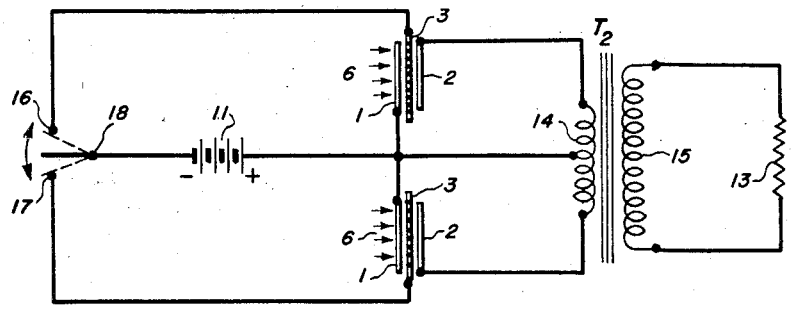
Fig. 7 is a diagram illustrating means for producing alternate electric power from thermal energy.

Fig. 7 shows a pair of generators connected in a balanced circuit wherein a center tapped primary 14 of transformer $T_2$ has its outer terminals connected to opposite elements 2—2 and the secondary 15 connected to a matched load 13.

A source of voltage 11 is connected as shown with the negative terminal thereof running to the pole of a S.P.D.T. switch 16—17—18. Terminals 16 and 17 of the switch are connected to opposite elements 3—3 respectively.

When the switch is oscillated to and from its two positions, as shown by arrow, and thermal energy 6—6 applied to elements 1—1 alternating current pulses will appear in primary 14.

These pulses will appear as alternating current power in the secondary 15 at a frequency and voltage corresponding with the frequency of the oscillation of the switches and the ratio of the transformer respectively.

The wave form of the output voltage and current will correspond to the reactance characteristics of the transformer.

The diagram in Fig. 8 is substantially the same as Fig. 7 except the excitation switch 16—17—18 as been replaced by electronic components comprising a transformer $T_3$ and a pair of rectifiers 20—20, which may be contact type diodes. The primary 21 is intended to be connected to a source of alternating voltage $L_1$—$L_2$ of low power. Each outer terminal of secondary 19 is connected through a diode 20 to each control element 3. The center tap of secondary 19 is connected to both elements 1, as shown.

The diodes are poled to permit only negative potentials applied to elements 3. Thus when an oscillating potential is applied to primary 21 of $T_3$ periodic negative pulses will alternately be applied to elements 3—3 resulting in an alternating current flowing in load 13 having the same frequency as the voltage applied to transformer $T_3$ and a voltage across load 13 determined by the ratio of transformer $T_2$.

Fig. 9 illustrates a self excited thermal alternator which is substantially the same as shown in Fig. 8 except an electronic oscillator is connected to transformer $T_3$ which receives its operating power from circuit to a tertiary winding 22 in transformer $T_4$. Thus when thermal energy 6—6 is applied to elements 1—1 and a starting potential, now shown, applied to transformer $T_3$ the generator will continuously produce A.C. power to the load 13 as previously described.

Fig. 10 illustrates a means for automatically regulating the output of the thermal alternator to compensate for variations in thermal energy applied to and variations in load on the alternator. The arrangement is substantially the same as shown in Fig. 8 except for the provision of a conventional electronic differential amplified and voltage reference unit 24 connected in the mid-tap circuit of transformer $T_3$ and regulated by a circuit from the secondary of output transformer $T_2$ in which a diode 20 is connected.

Thus variations in the A.C. output voltage will be sampled and a rectified portion thereof impressed on amplifier 24 which by well known means will proportionately change the negative potential applied to the control elements 3 through the mid-tap connection in transformer $T_3$ and thus regulate the electron emission reaching the elements 2.

It is to be understood that the dual generators shown in Figs. 7 through 10 may be made as single units by appropriate insulation between the opposite elements 2 and 3.

It is now apparent that alternating current may be produced at predetermined voltages from the thermal electronic devices described, without the use of moving parts, which will respond to various sources of heat, such as the exhaust gases of engines, waste heat from furnaces or heat generated from combustible fuels such as natural gas and the like.

Having described my invention, I claim:

1. A thermal electric generator comprising an electron emissive element and an electron collector element having the active surfaces thereof retained in close spaced relation, a control element having an active foraminated portion positioned between said emissive and said collector elements, heat resistant insulation means bonded to said elements forming a hermetic enclosure for said active surfaces and insulating each said element from each other, an electric output circuit means connected to said emissive and said collector elements, a voltage circuit means connecting said control element and said emissive element adapted to apply a predetermined negative potential to said control element with respect to said emissive element when closed, a source of thermal energy whereby a flow of electrons will radiate from said emissive element through said foraminated portion of said control element into said collector element and produce a flow of direct current electric energy in said output circuit means when said source of thermal energy is applied to said emissive element and whereby said flow of electrons and said direct current energy will be reduced when said voltage circuit means is closed.

2. A thermal electric generator comprising a hollow tubular emissive element having the property of releasing electrons when heated, a hollow cylindrical collector element having the property of absorbing electrons positioned coaxial with and in spaced relation to said emissive element, a tubular control element having a foraminated portion positioned between said emissive and collector elements, heat resistant insulating means bonded to the outer ends of said elements forming a hermetic space between said elements with said space evacuated to a predetermined low pressure, thermal energy means for heating the exposed surface of said emissive element, output circuit means connected to said emissive and said collector elements, a voltage circuit means connecting said control element and said emissive element adapted to apply a predetermined negative potential to said control element with respect to said emissive element when closed, whereby a flow of electrons will radiate from said emissive element through said foraminated portion of said control element into said collector element and produce a flow of direct current electric energy in said output circuit when said emissive element is heated by said thermal energy means and said voltage circuit means is open and whereby the closing of the latter circuit will reduce said flow of electrons and said direct current energy in said output circuit.

3. A thermal electric pulse generator comprising a thermal electric means having an emission electrode and output electrode and a control electrode, said electric means adapted to produce an electric difference of potential across said emissive and output electrodes when the former is heated and the latter is operated at a temperature below that of the former, a step-up output transformer having its primary connected to said emissive and said output electrodes and the secondary thereof connected to an electric load, a source of voltage connected to said emissive and said control electrodes through a switch means adapted to apply a negative voltage to said control electrode when said switch means is closed for reducing said difference of potential whereby the opening and closing of said switch means will produce corresponding electric power pulses in said load at a potential higher than said difference of potential when said emissive electrode is heated.

4. A thermal alternator comprising a thermal electric means having a pair of electrically common emissive electrodes and a pair of independent collector electrodes and a pair of independent control electrodes, said electric means adapted to produce a substantially equal difference of potential across each pair of emissive and collector electrodes when the former are heated, a step-up transformer with a primary winding having each outer terminus thereof connected to each of said collector electrodes and the secondary winding thereof connected to an electric load, a mid-tap in said primary winding connected to both said emissive electrodes, an exciter inductance having a mid-tap connected to said emissive electrodes, oscillating means for inductively coupling alternating current to said inductance when energized, each outer terminus of said inductance connected to each said control electrode through a rectifier means whereby a negative potential will alternately be applied to each of said control elements with respect to said emissive electrodes when said oscillating means is energized and whereby said electric means will produce alternate electric pulses in the said windings of said transformer for energizing said load with alternating current energy when said emissive elements are heated.

5. The construction recited in claim 4 including a tertiary winding in said transformer connected to said oscillating means adapted to induce and transmit a portion of the electric energy in said transformer to energize said oscillating means when said alternator is operated.

6. The construction recited in claim 4 including a differential amplifier and voltage reference means having its input connected to the said secondary winding of said transformer through a third rectifier means and its output connected in series with the said mid-tap connection to said inductance, said reference means adapted to respond to a rectified sample of alternating potential across said secondary winding and provide a bias potential in said mid-tap connection in proportion to the potential across said load and regulate the negative potential applied to said control electrodes for stabilizing said alternating energy in said load when the latter or the heating of the emissive electrodes is varied.

7. In a thermal electric generator of the character described an electron emissive element and an electron collector element having the active surfaces thereof retained in adjacent relation, a control element having an active portion positioned between said emissive and said collector elements, heat resistant insulation means bonded to said elements forming a hermetic enclosure for said active surfaces and insulating predetermined boundaries of each said elements from each other, an electric output circuit means connected to said emissive and said collector elements, a voltage circuit means connecting said control element and said emissive element adapted to apply predetermined periodic potentials to said control element with respect to said emissive element when energized and operated, a source of thermal energy whereby a substantially like periodic flow of electrons will radiate from said emissive element through said active portion of said control element into said collector element and produce a substantially like periodic flow of alternating current electric energy in said output circuit means when said source of thermal energy is applied to the outer surface of said emissive element and said voltage circuit means is energized and operated.

References Cited in the file of this patent

UNITED STATES PATENTS 2,753,522     Marsden _____ July 3, 1956